US011056114B2

(12) United States Patent
Hatfield et al.

(10) Patent No.: US 11,056,114 B2
(45) Date of Patent: Jul. 6, 2021

(54) VOICE RESPONSE INTERFACING WITH MULTIPLE SMART DEVICES OF DIFFERENT TYPES

(71) Applicant: INTERNATIONAL BUSINESS MACHINES CORPORATION, Armonk, NY (US)

(72) Inventors: Jennifer M. Hatfield, San Francisco, CA (US); Michael Bender, Rye Brook, NY (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/426,606

(22) Filed: May 30, 2019

(65) Prior Publication Data

US 2020/0380968 A1 Dec. 3, 2020

(51) Int. Cl.
*G10L 15/22* (2006.01)
*G06N 7/00* (2006.01)
(Continued)

(52) U.S. Cl.
CPC ............ *G10L 15/22* (2013.01); *B60R 25/257* (2013.01); *G06F 16/90* (2019.01); *G06N 7/005* (2013.01); *G07C 9/00896* (2013.01); *G10L 15/30* (2013.01); *G07C 2009/00928* (2013.01); *G10L 2015/223* (2013.01)

(58) Field of Classification Search
CPC ........ G10L 15/22–15/228; G10L 15/30; G06F 16/90; B60R 25/257; G06N 7/005; G07C 9/00896; G07C 2009/00928
See application file for complete search history.

(56) References Cited

U.S. PATENT DOCUMENTS 9,172,747 B2 10/2015 Walters et al.
9,812,126 B2 11/2017 Khan et al.
(Continued)

OTHER PUBLICATIONS

Budiu, R. et al., "Intelligent Assistants Have Poor Usability: A User Study of Alexa, Google Assistant, and Siri" UX Certification (Jul. 2018) pp. 1-18, https://www.nngroup.com/articles/intelligent-assistant-usability/, accessed on Feb. 28, 2019.

*Primary Examiner* — Abul K Azad
(74) *Attorney, Agent, or Firm* — Tutunjian & Bitetto, P.C.; Michael A. Petrocelli

(57) ABSTRACT

A computer enabled method of controlling a secondary system with a primary system for taking commands that includes analyzing a historical database to create a probability factor for matching an initial commands to a primary device and a following interaction to generate secondary requests to a second device. The method further includes receiving a user command at the primary device, and determining whether the user command at the primary device matches at least one initial commands having above a threshold value for the probability factor linking the initial command to the primary device to the request the at least one secondary device. The method further includes sending a signal to activate the at least one secondary device to perform the request without requiring an activation command from the user.

20 Claims, 7 Drawing Sheets

(51) Int. Cl.
   *G06F 16/90*   (2019.01)
   *G10L 15/30*   (2013.01)
   *B60R 25/25*   (2013.01)
   *G07C 9/00*    (2020.01)

(56) References Cited

U.S. PATENT DOCUMENTS

| | | |
|---|---|---|
| 10,009,666 B1 | 6/2018 | van Scheltinga et al. |
| 10,026,399 B2 | 7/2018 | Gopalan et al. |
| 10,133,612 B2 | 11/2018 | Wood et al. |
| 10,796,563 B1* | 10/2020 | Bell .................. G04G 21/04 |
| 10,796,706 B2* | 10/2020 | Davis ................. G10L 19/018 |
| 10,867,604 B2* | 12/2020 | Smith ................. H04R 3/005 |
| 2013/0226847 A1 | 8/2013 | Cruse et al. |
| 2014/0245140 A1 | 8/2014 | Brown et al. |
| 2015/0154976 A1* | 6/2015 | Mutagi ............... H04L 12/281 |
| | | 704/275 |
| 2015/0186156 A1 | 7/2015 | Brown et al. |
| 2015/0366518 A1* | 12/2015 | Sampson ............ A61B 5/0261 |
| | | 600/301 |
| 2016/0259656 A1 | 9/2016 | Sumner et al. |
| 2016/0261932 A1 | 9/2016 | Fadell et al. |
| 2018/0098277 A1* | 4/2018 | Brageul .............. H04B 1/385 |
| 2018/0121824 A1 | 5/2018 | Han et al. |
| 2018/0144748 A1 | 5/2018 | Leong |
| 2019/0082229 A1* | 3/2019 | Grumer ............. H04N 21/4532 |

* cited by examiner

VOICE RESPONSE INTERFACING WITH MULTIPLE SMART DEVICES OF DIFFERENT TYPES

BACKGROUND

The present invention generally relates to processing of voice commands and voice response systems, and more particularly to managing feedback on multi-party phone calls.

As the interfaces to voice response system, such as digital assistants, are being proliferated into many devices. The desire to interact with multiple front ends becomes a challenge when dealing with the different requirements of multiple types of voice response systems being employed in the same setting. For example, dialog interfacing with one system can frequently lead to waking up another system. Because, those interfaces require a unique wake up word or phrase to initiate interaction between them, the voice response system to the device being controlled through the voice response system can cause delays during the "wake up" process sequence, especially considering the scenario when a same setting may include multiple voice response systems of different types.

SUMMARY

In accordance with an embodiment of the present disclosure, a computer enabled method of controlling a secondary system with a primary system for taking commands is provided. In some embodiments, the primary system includes a voice response system, and the secondary system may include a sleep mode that needs to be woken by an activation command in order for the secondary system to perform functions.

The computer enabled method may include capturing initial commands to the primary system to provide a historical database of initial commands. The historical database of initial commands includes requests for functions to be performed by at least one secondary device and requests not directed to functions to be performed by at least one secondary device. The method further includes analyzing the historical database to create a probability factor for matching the initial commands to the primary device and a following interaction to generate secondary requests. In some embodiments, the method further includes receiving a user command at the primary device. The method can continue with determining whether the user command at the primary device matches at least one initial commands having above a threshold value for the probability factor linking the initial command to the primary device to the request the at least one secondary device. A signal can be sent to activate the at least one secondary device to perform the request without requiring an activation command from the user.

In another aspect, a system is provided for controlling a secondary system with a primary system for taking commands. In some embodiments, the primary system includes a voice response system, and the secondary system may include a sleep mode that needs to be woken by an activation command in order for the secondary system to perform functions. In one embodiment, the system for controlling the secondary system with the primary system for taking commands can include a database of initial commands to the primary system, wherein the database of initial commands includes requests for functions to be performed by at least one secondary device and requests not directed to functions to be performed by at least one secondary device. The system may further include a probability factor calculator including at least one hardware processor for analyzing the historical database to create a probability factor for matching the initial commands to the primary device and a following interaction to generate secondary requests. The system can also include a request linking calculator for determining whether the user command at the primary device matches at least one initial commands having above a threshold value for the probability factor linking the initial command to the primary device to the request the at least one secondary device. A transmitter may also be present in the system for sending a signal to activate the at least one secondary device to perform the request without requiring an activation command from the user.

In yet another aspect, a computer program product is provided that includes a computer readable storage medium having computer readable program code embodied therein for controlling a secondary system with a primary system for taking commands. The method provided on the computer readable program code may provide steps that include capturing initial commands to the primary system to provide a historical database of commands, wherein the historical database of initial commands includes requests for functions to be performed by at least one secondary device and requests not directed to functions to be performed by at least one secondary device. In a following step, the method may include analyzing the historical database to create a probability factor for matching the initial commands to the primary device and a following interaction to generate secondary requests. The method may also include receiving a user command at the primary device; and determining whether the user command at the primary device matches at least one initial commands having above a threshold value for the probability factor linking the initial command to the primary device to the request the at least one secondary device. The method may further include sending a signal to activate the at least one secondary device to perform the request without requiring an activation command from the user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
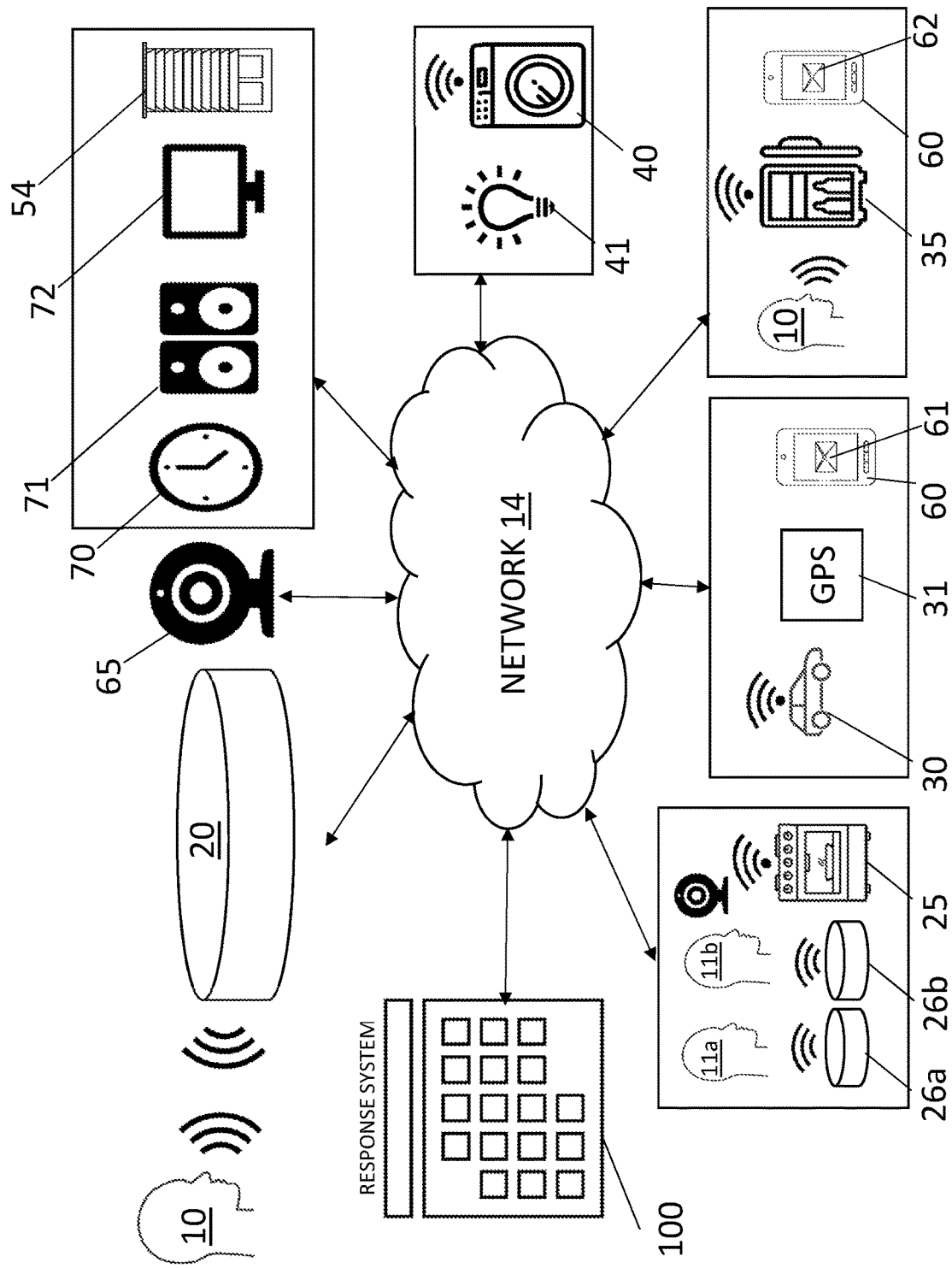
FIG. 1 is a diagram illustrating an example environment for controlling a secondary system with a primary system for taking commands, in accordance with one embodiment of the present disclosure.

In some embodiments, the disclosure provides methods, systems and computer program products that provide a method of cognitive analysis of the systems a person interacts with to determine patterns and probability that an interaction with a secondary device will be initiated. As will be described herein, the system that the person is interacting with is a "voice response system". As used herein, a "voice response system (VRS)" is a computer interface which responds to voice commands, instead of responding to inputs from a mouse or a keystroke. In some examples, the voice response system employs a type of speech synthesis where sentences are organized by pre-recorded words saved in a database. The voice response system (VRS) can be provided by a virtual assistant. The term "virtual assistant" denotes a software agent that can perform tasks or services for an individual based on verbal commands. Some virtual assistants are able to interpret human speech, and respond via synthesized voices. Users can ask their assistants questions, control home automation devices and media playback via voice, and manage other basic tasks such as email, to-do lists, and calendars with verbal commands. The secondary device may be an appliance, e.g., kitchen appliance; temperature control device, e.g., thermostat or other air conditioning and/or heating control device; or other voice interfaces. A voice response system (VRS), such as a virtual assistant, can receive voice commands that are used to control the secondary devices. In some instances, the secondary device may have an interface that is different than the type of interface that is used to control the virtual assistant. Additionally, the secondary device can be in low power mode, sleep mode, stand by mode or suspend mode, in which in order for the secondary device to take commands for providing a function, the secondary device may be switched to an active mode during which commands can be performance by a wake up function. In some instances, the wake up function would be another voice command. In this instance, a user would have to make two voice commands, a first to give commands to the primary device, which is the voice response system, such as the digital assistant, and a second voice command to activate, e.g., wake up, the secondary device. The methods, systems and computer program products described herein can determine when commands to the primary device would result in activating a secondary device. For example, when voice commands are determined to have a high probably of interaction with the secondary device a threshold value is calculated. When the probability of interaction crosses a threshold, then the secondary device will be sent a wake up from the system and the human interaction requested through the primary can occur without having to specifically send another command for a wake up function, e.g., push the start button, of the secondary device. In some embodiments, if a secondary request has a high enough propensity of being requested, an audio interface will ask that question as part of a recommendation, e.g., the primary device may state "do you want to take action through the secondary device". The systems, methods and computer program products are now described with more detail with reference to FIGS. 1-7.

Figure 2:
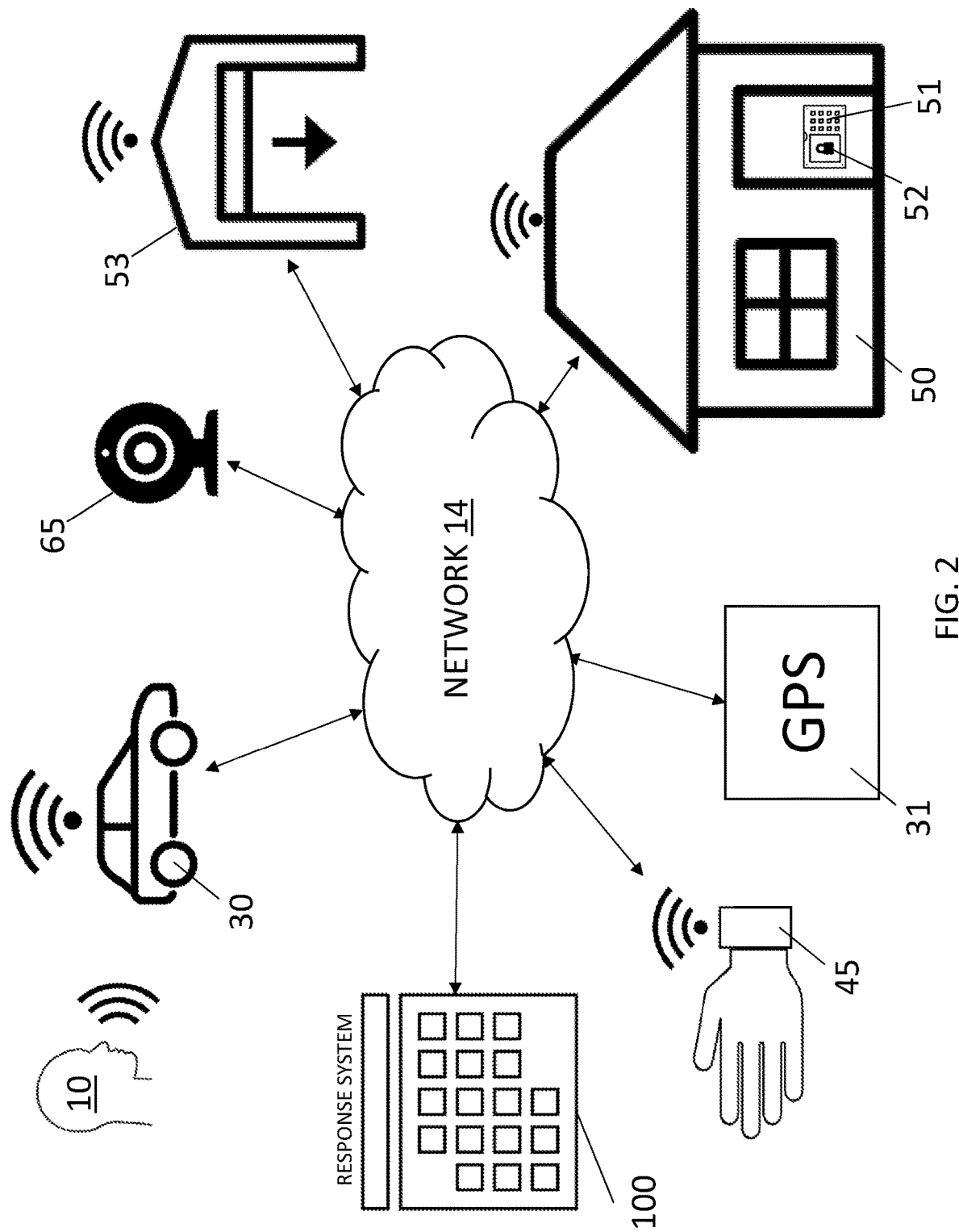
FIG. 2 is a diagram illustrating another example environment for controlling a secondary system with a primary system for taking commands, in accordance with one embodiment of the present disclosure.
Figure 3:
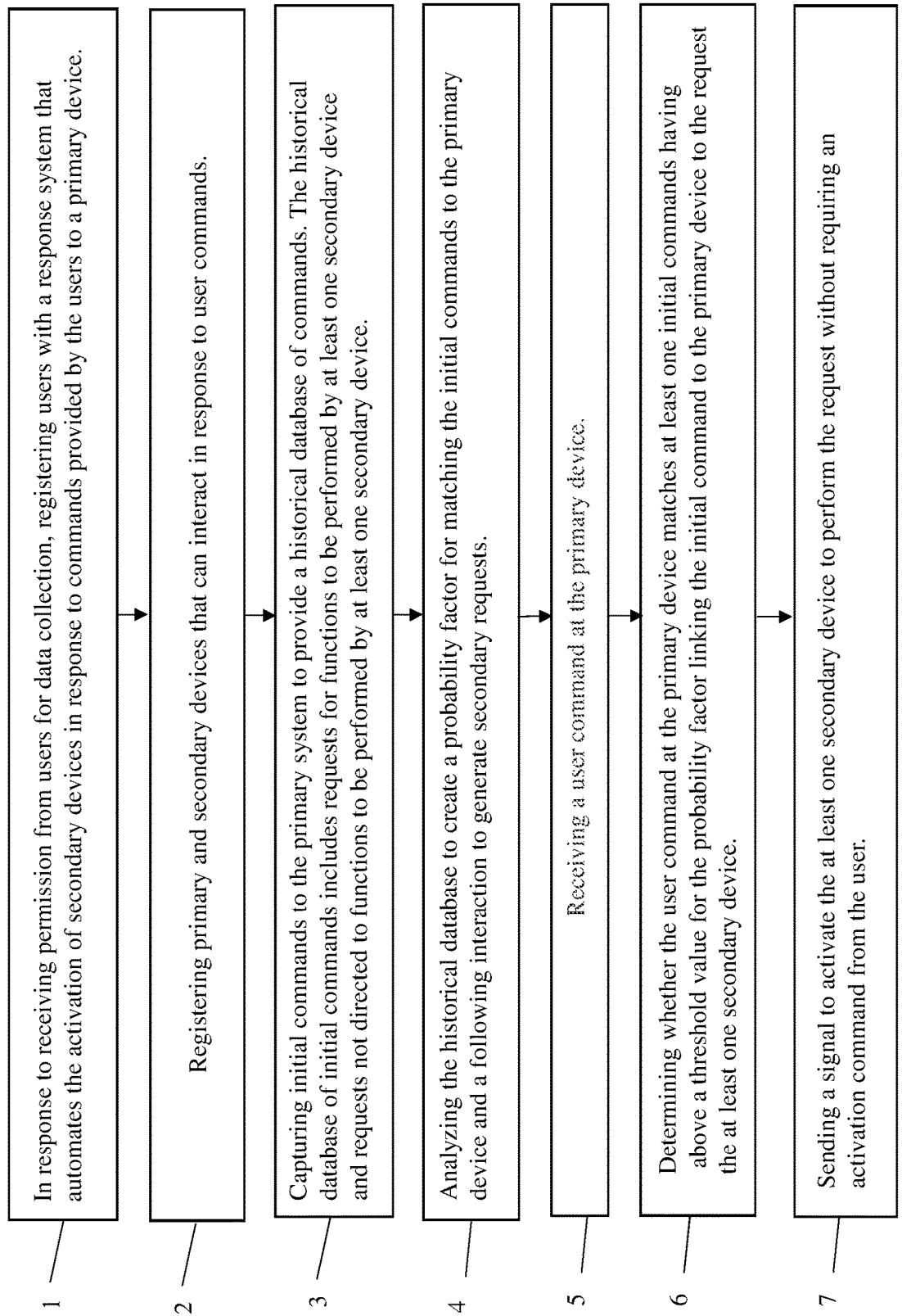
FIG. 3 is a block/flow diagram showing a method for controlling a secondary system with a primary system for taking commands, in accordance with an embodiment of the present invention.

FIGS. 1 and 2 are diagrams illustrating an example environments for controlling a secondary system with a primary system for taking commands. FIG. 3 is a block/flow diagram showing a method for controlling a secondary system with a primary system for taking commands, in accordance with an embodiment of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the method may begin at block 1, which can include registering users with the system for controlling secondary systems by commands that are given to a primary system. As will be described herein, in some instances the primary system includes a voice response system, and the secondary response may include a sleep mode. For the secondary system to perform functions, the secondary device should be switched from a sleep mode to an activation mode.

Referring to block 1 of the process flow that is depicted in FIG. 3, the method may begin with in response to receiving permission from a user 10 for data collection, registering users with the response system 100, e.g., voice response system, which automates the activation of secondary devices in response to commands provided by the users to the primary device. In some instances, the primary device takes user commands from the users by a voice response system.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to block 2 of the method depicted in FIG. 3, the method may continue with registering primary devices and secondary devices, as well as any device, e.g., internet of things (IOT) device 65, that can record environmental and/or user interactions with the primary and secondary devices, with the response system 100, e.g., voice response system, that automates the activation of secondary devices in response to commands provided by the users to the primary device. The response system 100 may employ the devices to determine interrelationships between the primary devices and the secondary devices that occur when the user is interacting with at least the primary device.

Referring to FIGS. 1-3, the primary device can be any device that the user 10 interacts with to perform a function. For example, the primary device may be a digital assistant 20; an appliance, such as an oven 25, refrigerator 35 or clothes washer; a vehicle having smart car capabilities 30; a wearable smart device 45, such as a fitness tracker; or a combination thereof. In some instances, the primary device employs a voice response system to interact with the user 10.

The secondary device may also be an appliance, e.g., kitchen appliance, such as an oven or refrigerator. In some instances, the secondary devices can be the elements that make up smart home, such as motorized garage doors, door locks, security systems, etc. The secondary device may also be a temperature control device, e.g., thermostat or other air conditioning and/or heating control device; or other voice interfaces that can interact with a smart home. In some other examples, the secondary devices are mobile devices 60, such as laptops, tablets, smart phones, smart watches, etc., that are running an application 61 that interacts with the user 10.

The devices, e.g., internet of things (IOT) device 65, that can record environmental and/or user interactions with the primary and secondary devices can be intelligent systems that can gather historical interactions with a device, e.g., the primary device, and any secondary interactions, e.g., secondary interactions with secondary devices, that follow that initial interface. This can create a corpus that is continually being improved through a learning loop to initiate secondary transactions. The system will gather data from IoT devices 65 to create a stronger basis for interactions that will or will not create secondary interactions. The data collected IoT devices 65 may include time, date, temperature, weather, levels of sunlight, as well as any environmental factors that can affect interactions by the users 10 with the primary and secondary devices.

In some examples, the IoT devices 65 have a microphone for receiving user communications and can include a system that has a universal vocabulary, or basic machine-to-machine language capabilities, that can allow the IoT devices 65 to communicate with the conference system 14, for providing communications by the users to be analyzed for their relevance to the subject of the multi-party conversation. For example, the vocabulary measured by the IoT devices 65 can be in plain English phrases or through some other form of abstraction. The vocabulary can be scalable such that new additions can be added to the vocabulary, e.g. for more complex actions. In one example, the vocabulary may be, or may include, an STN model for IoT devices.

One form of internet of things (IOT) device that is suitable for use as the connected IoT devices 65 to the network 14 includes a microphone for measuring sounds, such as voices. These may be virtual assistant type devices. Other internet of things (IOT) devices that can be suitable for collecting environmental factors that can impact the interaction between primary and second systems includes televisions and media boxes; phones and tablet computers; laptop and desktop computers; smart home devices, such as lamps, light switches, thermostats, smoke alarms etc.; wearable and earphones and computer program products.

In some embodiments, the IOT devices 65 may also include a video camera for recording the motions of the users 10. This video information can be used to determine if the user 10 is engaged in an activity/exercise/event that could provide information regarding correlating a command provided to a primary device and a subsequent request being placed on secondary device. The IOT devices 65 may be coupled to the network 14 to communicate data between the IOT devices 65 and the response system 100, e.g., voice response system, that automates the activation of secondary devices in response to commands provided by the users to the primary device.

Some examples of the IOT devices 65 that can include a video camera for include a personal computer, a computer monitor, a phone, a laptop, a tablet computer, a lightbulb, a luminaire, a lighting system, a door lock, a water heater, a sprinkler system, an air-conditioner, a thermostat, an alarm clock, a window shade, a switch, a smoke alarm, an electrical outlet, an alarm, a personal proximity sensor, a door sensor, a biometric sensor, a mobile device, an automotive sensor, a cooking device, an electrical breaker, a personal alert sensor, a motion sensor, a calendar, a television, a radio, a radio frequency identification (RFID) tag/RFID detector, a vehicle, an electric vehicle charger, a distributed generator (e.g. solar panel), a distributed energy storage (e.g. battery), a thermometer, and combinations thereof.

The Internet of things (IoT) is the network of physical devices, vehicles, home appliances, and other items embedded with electronics, software, sensors, actuators, and connectivity which enables these things to connect, collect and exchange data. The IoT devices 65 can be equipped with various types of sensors to collect information about themselves and their surroundings, and provide the collected information to the response system 100 over the network 14.

In some examples, the IOT devices 65 or a hub that the IOT devices 65 are in communication with include a cellular radio to establish a connection to the Internet via a cellular service such as a 4G (e.g., Mobile WiMAX, LTE) or 5G cellular data service. Alternatively, or in addition, the IOT devices or a hub that the IOT devices are in communication with include a may include a WiFi radio to establish a WiFi connection through a WiFi access point or router which couples the IOT devices 65 or IOT hub to the Internet (e.g., via an Internet Service Provider providing Internet service to the end user), which in turn connect to the response system 100/network 14. Of course, it should be noted that the underlying principles of the invention are not limited to any particular type of communication channel or protocol.

In one embodiment, the IoT devices 26 are ultra low-power devices capable of operating for extended periods of time on battery power (e.g., years). To conserve power, the local communication channels may be implemented using a low-power wireless communication technology such as Bluetooth Low Energy (LE). In this embodiment, each of the IoT devices 26 are equipped with Bluetooth LE radios and protocol stacks.

Referring to FIG. 3, the method can continue at block 3 with capturing initial commands to the primary system to provide a historical database of commands. The historical database of initial commands includes requests for functions to be performed by at least one secondary device and requests not directed to functions to be performed by at least one secondary device. The historical database of commands may be stored in the system 100 using at least one component of hardware memory. Intelligent systems, e.g., the primary and secondary device 20, 25, 30, 35, 40, 45, 50 and 60, can gather historical interactions with a device and any secondary interactions that follow that initial interface. This will create a corpus that is continually being improved through a learning loop to initiate secondary transactions. In some embodiments, the system 100 will gather data from other IoT devices 65 to create a stronger basis for interactions that will or will not create secondary interactions.

Referring to block 4 of FIG. 3, the method may continue with analyzing the historical database to create a probability factor for matching the initial commands to the primary device and a following interaction to generate secondary requests. The "probability factor" is a measurement of the likelihood that a user command to a primary device, or a communication to the user 10 from the primary device, will be followed by a command to a secondary device.

In one embodiment, the system 100 will track all interactions and compare them to the corpus, e.g., the historical database of initial commands that includes requests for functions to be performed by at least one secondary device and requests not directed to functions to be performed by at least one secondary device. In some embodiments, as will be described below, if any interaction generates a high probability of initiating a secondary interface, the system will send communications to that secondary device to wake up. If interaction has a high enough correlation to a secondary interaction, the secondary device will prompt the user if they want to take that action.

Figure 4:
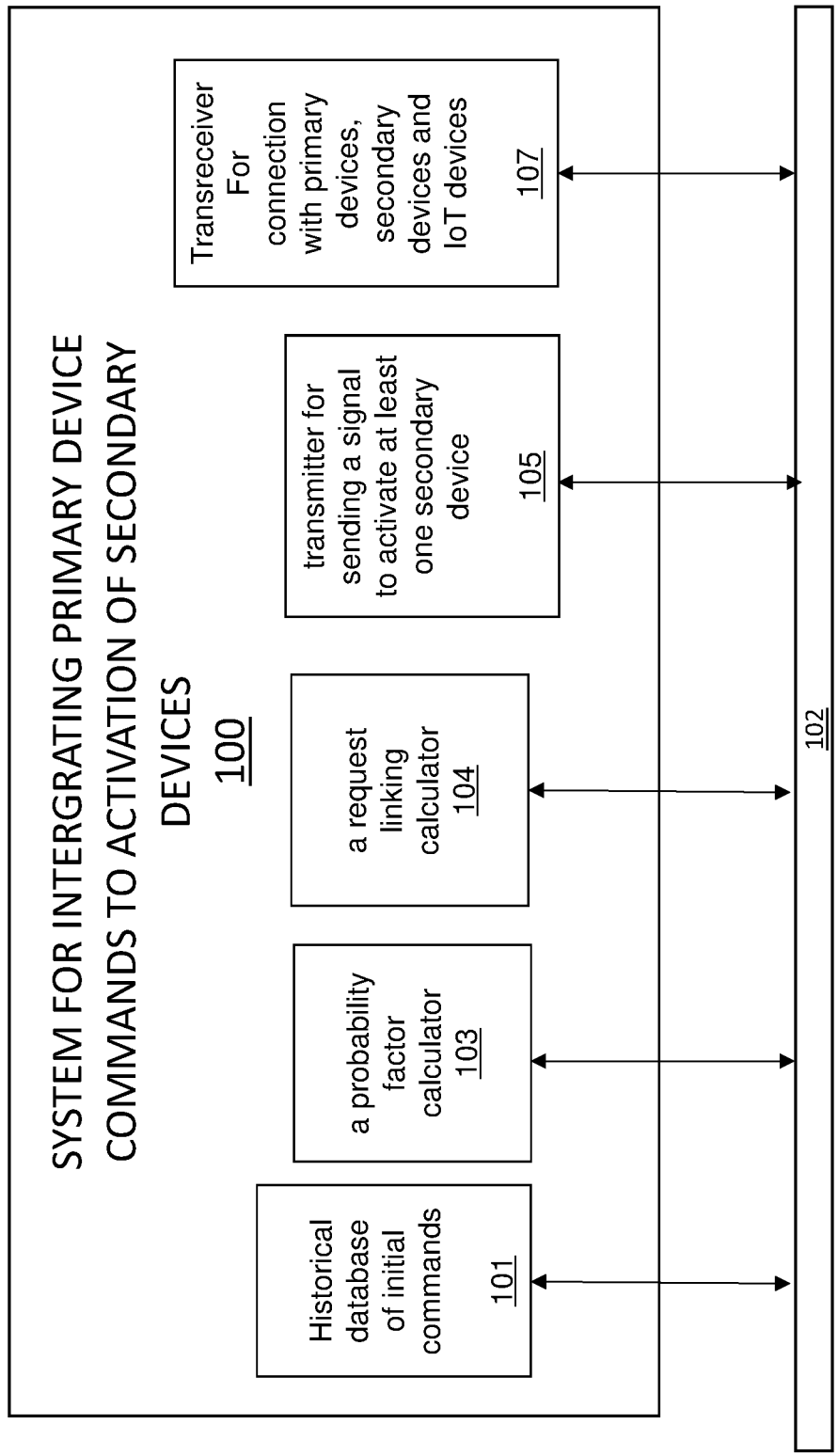
FIG. 4 is a block diagram illustrating a system for controlling a secondary system with a primary system for taking commands, in accordance with one embodiment of the present disclosure.

FIG. 4 is a block diagram illustrating one embodiment of a system 100 for controlling a secondary system with a primary system for taking commands, in accordance with the method described with reference to FIGS. 1-3. The system 100 includes a probability factor calculator 103 to analyze the historical database to create a probability factor for matching the initial commands to the primary device and a following interaction to generate secondary requests. The probability factor calculator 103 can include at least one hardware device processor for performing a set of instructions stored on at least one memory device, in which the probability factor calculator 103 analyzes the content of historical database the initial commands to the primary device, the requests for functions to be prepared by the secondary device following the initial command, and the requests not directed towards the functions of the secondary device, in determining matches between initial commands and requests for functions of secondary devices. The probability factor calculator 103 can also consider environmental factors measured by the IoT devices 65 in determining the probability factor for matching the initial commands to the primary device and a following interaction to generate secondary requests.

Calculating the probability factor may include cognitive analysis of inputs from the commands to the primary device, requests to the secondary device, and environmental factors measured by the IOT devices 65, providing a weight for each condition, and compare defined actions to weighted result of all inputs.

The probability factor calculator 103 may be provided by some form of artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

In one embodiment, the method to learn user preferences, i.e., the steps for analyzing the historical database to create a probability factor for matching the initial commands to the primary device and a following interaction to generate secondary requests, may include the response system 100 identifying a user 10, receiving feeds from registered IoT devices 65 to determine environmental conditions, recording initial commands to primary devices linked to users 10 and conditions, and recording secondary command/action in relation to initial command and the environmental conditions.

In some embodiment, the response system 100 including the probability factor calculator 103 may employ a method to learn to identify specific user patterns within multiple users of the system, in which the system 100 learns to differentiate users and patterns specific to that user in a multi-person household or common area with shared IoT devices 65. In one embodiment, the method may include identifying a user 10 involved with a communication, and identifying current environmental conditions, e.g., as measured by the IoT devices 65. In some examples, when an initial command is given, response system 100 predicts probability that a secondary action based on user and environmental conditions will be given. If the threshold for a predicted secondary command exceeds the configured value, but is lower than the recommendation threshold, the secondary device goes into wakeup mode. If the threshold for a predicted secondary command exceeds the configured value, the option is presented to the user 10 in relation to initial command as a yes/no question, e.g "would you like to do this action?". The system 100 can also ask the user, if the user would like to automatically take this action in the future.

Referring to FIG. 3, the method may continue with block 5, which includes receiving a user command for the primary device. As noted above, the user command may be a voice command by the user 10 to a primary device that could be a digital assistant that employs a voice response system. In other embodiments, the user command could be a voice command regarding a status or inventory request being placed on an appliance having a voice response system. In other embodiments, the primary device may be an appliance that sends an update to the user, e.g., by voice command, an alarm noise, an electronic communication sent to the mobile device of the user, or a combination. In yet other embodiments, activation by the user of an application, e.g., a fitness tracking application, on a mobile device being used by the user 10 can provide a user command to the primary device.

Referring to FIG. 3, the method can continue to block 6, which includes determining whether the user command at the primary device matches at least one initial commands having above a threshold value for the probability factor linking the initial command to the primary device to the request the at least one secondary device. When the user command at the primary device matches or is similar to an initial commend having above a threshold for a probability factor that a particular secondary request will also be requested by the user, the system then functions to at least ready the secondary systems to receive that request. For example, the secondary device may be sent a signal to wake from a sleep mode to an active mode for performing a function without the need of the user to make specific requests to the secondary device. When the user command at the primary device is not similar to an initial command having a high probability factor for making a secondary request to the secondary device, the system does not facilitate additional interactions with the secondary device (also referred to as secondary system).

The determination of whether a user command at the primary device matches at least one initial commands having above a threshold value for the probability factor linking the initial command to the primary device to the request the at least one secondary device at block 6 may be calculated by a request linking calculator 104, as depicted in FIG. 4. The request liking calculator 104 may include at least one hardware device processor for performing a set of instruction stored on at least one memory device. The request linking calculator 104 determines matches between the user command at the primary device and the at least one initial commands having above a threshold value for the probability factor linking the initial command to the primary device to the request to the at least one secondary device.

The request linking calculator 104 may include some form of artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring to FIG. 3, in the example in which the user command at the primary device matches at least one initial commands having above a threshold value for the probability factor linking the initial commands to the primary device to the request the at least one secondary device, the method may continue to block 7. Block 7 includes sending a signal to activate the at least one secondary device to perform the request without requiring an activation command from the user 10.

The secondary device will wait for interaction or go back to sleep. Response, or lack there-of, is sent to the system to improve future prediction capability. The system can be configured such that a user interface will allow the system to determine which devices can be set to wake up and a threshold of confidence required to wake up or recommend a secondary item based on historical actions.

In some embodiments, the method described herein initiates interactions with a secondary always-on listening device based on cognitive analysis of interactions with a primary device. The methods and systems may employ a learning loop that is supplemented with information from IoT devices 65. In some embodiments, the secondary device can request validation of predicted action if probability that request will be processed next is significantly high.

FIGS. 1 and 2 are diagrams illustrating example applications for controlling a secondary system with a primary system for taking commands. The primary and secondary devices are connected through a network 14 to the response system 100 that is further described with reference to FIG. 4, which can perform the method depicted in FIG. 3.

The primary and secondary devices can include cellular radio to establish a connection to the Internet via a cellular service such as a 4G (e.g., Mobile WiMAX, LTE) or 5G cellular data service to access the network 14; or the primary and secondary devices may include a WiFi radio to establish a WiFi connection through a WiFi access point or router which couples the primary and secondary devices to the Internet (e.g., via an Internet Service Provider providing Internet service to the end user), which in turn connect to the response system 100. Of course, it should be noted that the underlying principles of the invention are not limited to any particular type of communication channel or protocol. For example, in one embodiment, the first and second devices may be equipped with Bluetooth LE radios and protocol stacks.

One or more portions of the network 14 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 14 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The methods described with reference to FIG. 3 can be applied to a number of applications. For example, referring to FIG. 1, a user 10 may be in their vehicle, e.g., smart vehicle 30, when a global positioning system (GPS) mapping application 31 alerts the user 10 of upcoming traffic, e.g., a fifteen minute delay along a route. In this example, the alert to traffic is the user command at block 5 of the method depicted in FIG. 3. In this example, the response system 100 has learned through blocks 1-4 of the method depicted in FIG. 3, that the user 10 may use an electronic communication application to communicate with someone when the user 10 has been alerted to traffic delays. The mobile device 60 that provides electronic communication application 61 is the secondary device 60. In this example, the response system 100 automatically enables, e.g., wakes up, the secondary device 60 and/or electronic communication application 61 so that the user 10 may communicate with another party, e.g., by email and/or electronic text, as he typically would do upon being alerted by traffic by the primary device without the user having to enable the secondary devices, e.g., mobile device 60 and/or electronic communication application, by himself.

Referring to FIG. 1, in another application, an appliance such as a clothes washer and/or clothes dryer 40 communicates to the user 10 that laundry is completed. The clothes washer and/or clothes dryer 40 is the primary device that provides the user command. In this example, the response system 100 has learned through blocks 1-4 of the method depicted in FIG. 3, that there is a 50% chance that the user 10 may go to the basement immediately to get the completed laundry from the clothes washer and/or clothes dryer 40. In this instance, the response system 100 sends an instruction to lighting in the basement to turn on. In this example, the lighting is the secondary response, and the command to turn on the lighting 41, is the request sent to the secondary device.

In another application, the user 10 asks the voice response system of an appliance, such as a refrigerator 35, to list its contents. For example, the user 10 may ask a refrigerator 35 having a voice response system if it contains milk. The appliance having the voice response system, e.g., refrigerator 35, is the primary device. The user 10 making the voice command to the primary device provides the user command. In this example, the response system 100 has learned through blocks 1-4 of the method depicted in FIG. 3, that the user will add any items listed by the appliance as low to a shopping list application 62 on his mobile device 60. In this instance, the response system 100 sends an instruction to the mobile device 60 to include items having a low inventory to the shopping list application 62. For example, after the appliance, such as the refrigerator 35, reports to the user 10 its contents, e.g., 1 carton of milk, the response system 100 may add the low contents, e.g., milk, to the shopping list application 62 on the user's 10 mobile device 60. In this example, the mobile device 60/shopping list application 62 are secondary devices, and the command to add contents to the shopping list application 62, is the request sent to the secondary device. In some embodiments, the system 100 can send instructions to the mobile device 60 to ask the user if they would like low inventory items to be added to the shopping list application 62 on the user's 10 mobile device 60.

In another application, an appliance, such as an oven/stove 25, communicates to the user 10 that its function is completed, e.g., a food item has been fully cooked. The appliance, such as an oven/stove 25, is the primary device that provides the user command. In this example, the response system 100 has learned through blocks 1-4 of the method depicted in FIG. 3, that the user 10 in response to this information calls other persons, e.g., a first person 11a and a second person 11b, through a digital assistant 26a, 26b to communicate that the food item is ready. In this instance, the response system 100 automatically sends an instruction to digital assistants 26a, 26b used by the first and second person 11a, 11b to communicate to the first and second person 11a, 11b that the food item is ready. In this example, the digital assistants 26a, 26b of the first and second persons 11a, 11b are the secondary devices, and the request to inform the first and second persons 11a, 11b of the status of the item being prepared by the appliance, is the request sent to the secondary device. In some embodiments, the system employs an IOT device 65 to determine whether the first and second person 11a, 11b are proximate to their respective digital assistants 26a, 26b. In some embodiments, the IOT device 65 may be a video camera having the ability to recognize the first and second person 11a, 11b. If the IOT device 65 determines that one of the first and second person 11a, 11b is not present near their respective digital assistants 26a, 26b, the system will not send a message to the person 11a, 1 lb that is not near their digital assistant 26a, 26b.

Referring to FIG. 2, in another application, a user 10 may tell their vehicle, e.g., smart car 30, to unlock its doors. The response system 100 may determine that the vehicle is present in a garage 53 using a GPS system 31 and/or an IoT device 65, such as an IoT device having a video camera. In this example, the response system 100 may have learned through blocks 1-4 of the method depicted in FIG. 3, that there is a high probability that the user 10 will enter the vehicle, and drive the vehicle out of the garage 53. The response system 100 may then send a command to the garage door, which includes a voice response system, of the garage 53 if the user 10 wants to open the garage door. The user 10 making the voice command to the vehicle to open unlock the vehicle doors provides the user command. The garage doors of the garage 53 that include the voice response system for interacting with the user 10 is the secondary device.

In yet another application, a user 10 initiates a fitness activity on their wearable mobile device, e.g., smart watch 45. In this example, the wearable mobile device, e.g., smart watch 45, is a primary device for taking commands. In this example, the response system 100 may have learned through blocks 1-4 of the method depicted in FIG. 3, that there is a high probability that after the user 10 initiates the fitness activity, the user 10 will leave his home. In this example, the house is a smart house 50, in which door locks 51, and security systems 53, may be activated remotely. Using a GPS system 31 and/or IoT devices 65 having video capability, the response system 100 may determine whether the user 10 has left the house, and the response system 100 may set the alarm 52 and lock the door 51 of the house. When the user returns to the house, the doors may be unlocked and the security system is turned off.

Referring to FIG. 1, in another example, a digital assistant 20 having a voice response system may be the primary device. The user 10 by voice command may tell the primary device to set an alarm for an alarm clock that is located in the user's 10 bedroom. In this example, the response system 100 may have learned through blocks 1-4 of the method depicted in FIG. 3, that there is a high probability that after the user 10 sets the alarm, the user 10 will enter his bedroom, and turn off any entertainment devices, such as televisions 72 and stereos 71, and may close motorized window blinds 54. The entertainment devices, such as televisions 72 and stereos 71, as well as the motorized window blinds 54 are secondary devices. The secondary request is a command by the system 100 to turn off the entertainment devices, such as televisions 72 and stereos 71, and close the motorized window blinds 54.

FIG. 4 is a block diagram illustrating a response system 100 for controlling a secondary system with a primary system for taking commands. The system for controlling a secondary system with a primary system for taking commands may include a database 101 of initial commands to the primary system, wherein the database 101 of initial commands includes requests for functions to be performed by at least one secondary device and requests not directed to functions to be performed by at least one secondary device. The database 101 may include any hardware memory, such as a random access memory (RAM) device, a read-only memory (ROM) device, an erasable programmable read-only memory (EPROM or Flash memory) device, a static random access memory (SRAM) device and combinations thereof. Further details regarding the function of the database are provided in the description of block 3 of the method in FIG. 3.

The response system 100 further includes a probability factor calculator 103 including at least one hardware processor for analyzing the historical database to create a probability factor for matching the initial commands to the primary device and a following interaction to generate secondary requests. Further details regarding the function and structure of the probability factor calculator 103 are provided in the description of block 4 of the method in FIG. 3.

The response system 100 depicted in FIG. 4 further includes a request linking calculator 104 for determining whether the user command at the primary device matches at least one initial commands having above a threshold value for the probability factor linking the initial command to the primary device to the request the at least one secondary device. Further details regarding the function and structure of the request linking calculator 104 are provided in the description of block 5 of the method in FIG. 3.

In some embodiments, the response system 100 depicted in FIG. 4 further includes a transmitter 105 for sending a signal to activate the at least one secondary device to perform the request without requiring an activation command from the user 10. Further details regarding the function and structure of the transmitter 105 are provided in the description of block 7 of the method in FIG. 3.

In some embodiments, the response system 100 further includes a transreceiver 107 in communication with the primary systems and the secondary systems for capturing the initial commands to the database. The transreceiver 107 may also communicate with the IoT devices 65. Further details regarding the function and structure of the transreceiver 107 are provided in the description of blocks 1-3 and 5 of the method in FIG. 3.

Each of the components for the response system 100 that is depicted in FIG. 4 may be interconnected via a system bus 102.

Any of the systems or machines (e.g., devices) shown in FIG. 4 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIG. 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 5:
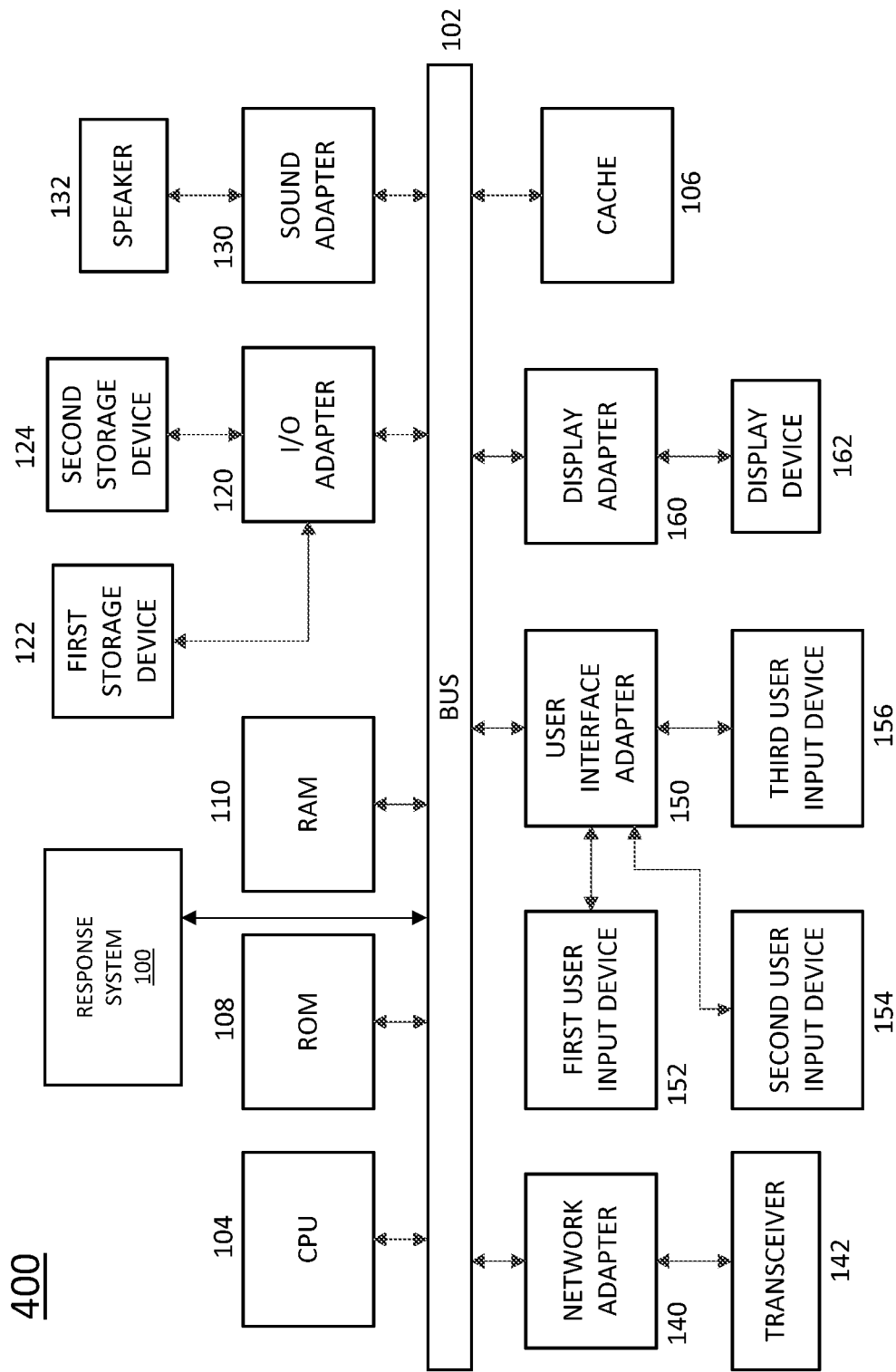
FIG. 5 is a block diagram illustrating a system that can incorporate the system depicted in FIG. 4 for performing a method for controlling a secondary system with a primary system for taking commands, in accordance with one embodiment of the present disclosure.
Figure 6:
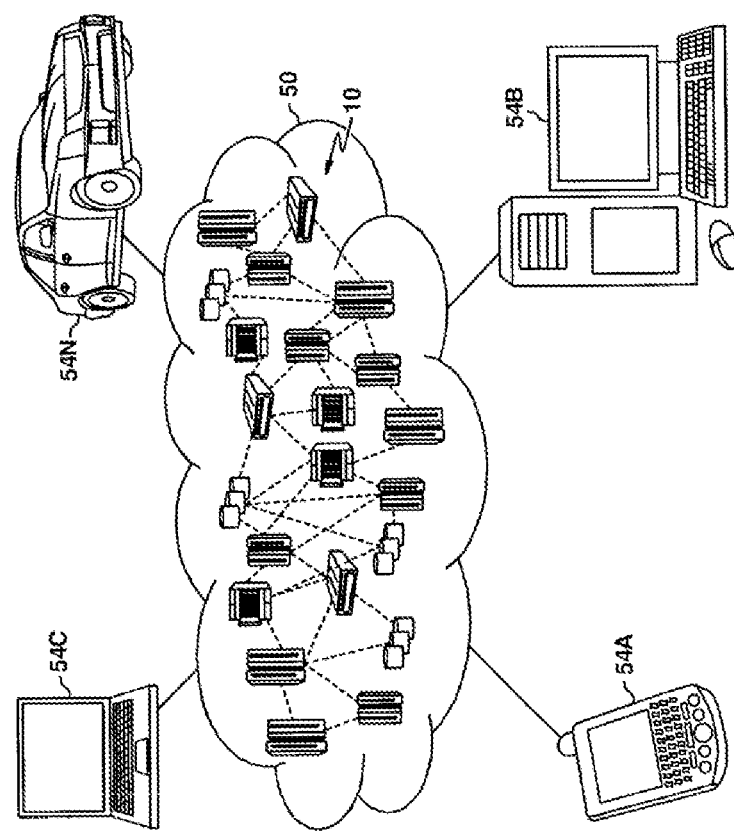
FIG. 6 depicts a cloud computing environment according to an embodiment of the present disclosure.
Figure 7:
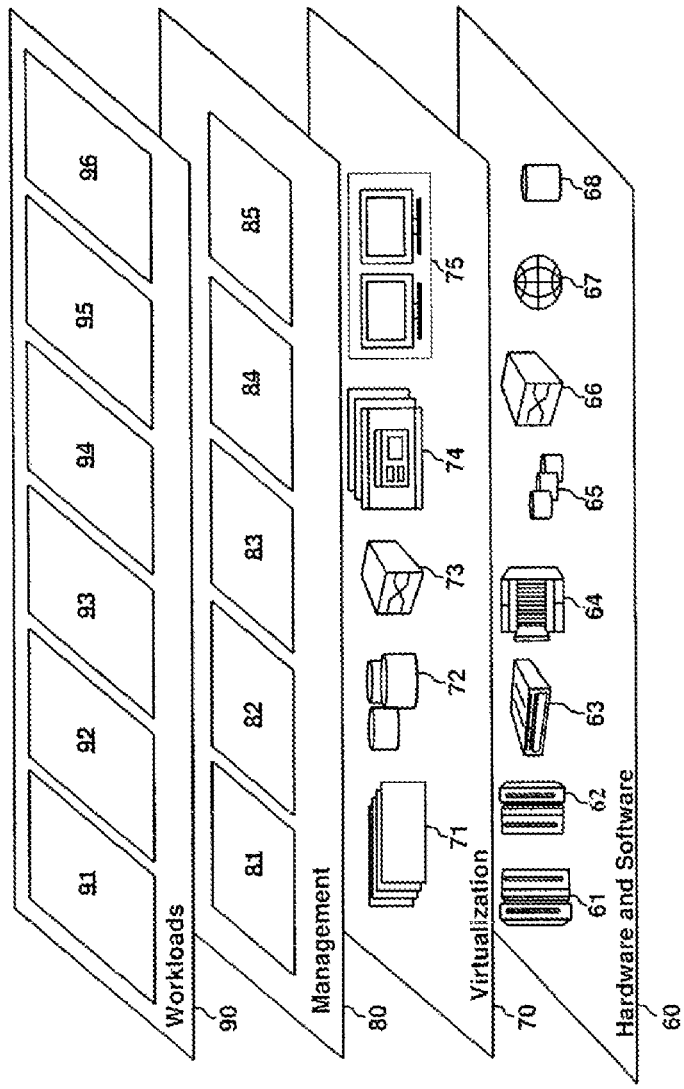
FIG. 7 depicts abstraction model layers according to an embodiment of the present disclosure.

The response system 100 may be integrated into the processing system 400 depicted in FIG. 5. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for controlling a secondary system with a primary system for taking commands. The method may include capturing initial commands to the primary system to provide a historical database of commands, wherein the historical database of initial commands includes requests for functions to be performed by at least one secondary device and requests not directed to functions to be performed by at least one secondary device. In a follow step, the method can include analyzing the historical database to create a probability factor for matching the initial commands to the primary device and a following interaction to generate secondary requests. In a following step, a user receives a command at the primary device, and it is determined whether the user command at the primary device matches at least one initial commands having above a threshold value for the probability factor linking the initial command to the primary device to the request the at least one secondary device. The method can further include sending a signal to activate the at least one secondary device to perform the request without requiring an activation command from the user. In some examples, the second device has a sleep mode that is activated automatically by the user command at the primary device that matches at least one of the initial commands having above a threshold value for the probability factor.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the conferencing system 100, which is described with reference to FIGS. 1-9.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a response system that automates the activation of secondary devices in response to commands provided by the users to the primary device (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer enabled method of controlling a secondary system with a primary system for taking commands, the computer enable method comprising:
    capturing initial commands to the primary system to provide a historical database of commands, wherein the historical database of initial commands includes requests for functions to be performed by at least one secondary device and requests not directed to functions to be performed by at least one secondary device;
    analyzing the historical database to create a probability factor for matching the initial commands to the primary device and a following interaction to generate secondary requests;
    receiving a user command at the primary device;
    determining whether the user command at the primary device matches at least one initial commands having above a threshold value for the probability factor linking the initial command to the primary device to the request the at least one secondary device; and
    sending a signal to activate the at least one secondary device to perform the request without requiring an activation command from the user.

2. The computer enabled method of claim 1, wherein the second device has a sleep mode that is activated automatically by the user command at the primary device that matches at least one of the initial commands having above a threshold value for the probability factor.

3. The computer enabled method of claim 1, further comprised of identifying environmental factors in classifying the initial commands in the historical database, and considering said environmental factors in creating the probability factor.

4. The computer enabled method of claim 3, further comprised of cognitive analysis of internet of things (IoT) data feeds for said capturing initial commands to the primary system to provide a historical database.

5. The computer enabled method of claim 1, wherein the primary device is a digital assistant.

6. The computer enabled method of claim 1, wherein the commands received by the primary device are voice commands from the user.

7. The computer enabled method of claim 1, wherien the secondary device is a kitchen appliance, a temperature control device, a security device, a laundry device, a lighting device or a combination thereof.

8. The computer enabled method of claim 1, wherein the secondary device has an interface that is different than the type of interface that is used in the primary device.

9. The computer enabled method of claim 1, further comprised of the secondary device proposing an action if the historical actions for the current conditions that exceed a given configured confidence factor.

10. The computer enabled method of claim 9, further comprised of the secondary device offering to automate the action when the conditions exceed the configured confidence factor.

11. The computer enabled method of claim 1, wherein the primary system is a vehicle receiving data from a global positioning system and the secondary system is a mobile device, wherein the initial command received from the GPS system is a traffic report, and the request to the secondary device is to open an electronic communication application.

12. The computer enabled method of claim 1, wherein the primary device is an appliance that takes voice commands to report status to the user making the voice commands, and the secondary device is a lighting device, wherein the initial command is to report the status of the appliance, and the request to the secondary device is to illuminate in response to the status of the appliance, when the status of the appliance indicates that the appliance has finished a job.

13. The computer enabled method of claim 1, wherein the primary device is an appliance that takes voice commands to report content within the appliance, and the secondary device is a mobile device having an application for preparing a shopping list, and the request to the secondary device is to add items to the shopping list when the appliance reports low contents.

14. The computer enabled method of claim 1, wherein the primary device is a vehicle located within a garage that takes voice commands to unlock doors for the vehicle, and the secondary device is a garage door opener for the garage, wherein the request to the secondary device is to open a garage door.

15. The computer enabled method of claim 1, wherein the primary device is a fitness activity device and the secondary device includes a GPS device, smart door of a house, and an alarm system, wherein the initial command to the primary device is to initiate a fitness activity ,the GPS device determines a location for the user, and the request to the at least one secondary device is to lock the smart door and turn the alarm system on, when the user leaves the house.

16. A system for controlling a secondary system with a primary system for taking commands comprising:
    a database of initial commands to the primary system, wherein the database of initial commands includes requests for functions to be performed by at least one secondary device and requests not directed to functions to be performed by at least one secondary device;
    a probability factor calculator including at least one hardware processor for analyzing the historical database to create a probability factor for matching the initial commands to the primary device and a following interaction to generate secondary requests;

a request linking calculator for determining whether the user command at the primary device matches at least one initial commands having above a threshold value for the probability factor linking the initial command to the primary device to the request the at least one secondary device; and a transmitter for sending a signal to activate the at least one secondary device to perform the request without requiring an activation command from the user.

17. The system of claim 16, wherein the second device has a sleep mode that is activated automatically by the user command at the primary device that matches at least one of the initial commands having above a threshold value for the probability factor.

18. The system of claim 17, further comprising a transreceiver in communication with the primary systems and the secondary systems for capturing the initial commands to the database.

19. A computer program product comprising a computer readable storage medium having computer readable program code embodied therein for controlling a secondary system with a primary system for taking commands, the method comprising:

capturing initial commands to the primary system to provide a historical database of commands, wherein the historical database of initial commands includes requests for functions to be performed by at least one secondary device and requests not directed to functions to be performed by at least one secondary device;

analyzing the historical database to create a probability factor for matching the initial commands to the primary device and a following interaction to generate secondary requests;

receiving a user command at the primary device;

determining whether the user command at the primary device matches at least one initial commands having above a threshold value for the probability factor linking the initial command to the primary device to the request the at least one secondary device; and sending a signal to activate the at least one secondary device to perform the request without requiring an activation command from the user.

20. The computer program product of claim 19, wherein the second device has a sleep mode that is activated automatically by the user command at the primary device that matches at least one of the initial commands having above a threshold value for the probability factor.

\* \* \* \* \*